US011959603B2

(12) United States Patent
Urry

(10) Patent No.: US 11,959,603 B2
(45) **Date of Patent: *Apr. 16, 2024**

(54) MULTI-ELEMENT FLEXIBLE STRAP LIGHT

(71) Applicant: Zyntony, Inc., Sandy, UT (US)

(72) Inventor: Robin Urry, Draper, UT (US)

(73) Assignee: Zyntony, Inc., Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,610

(22) Filed: Oct. 31, 2023

(65) Prior Publication Data

US 2024/0093843 A1 Mar. 21, 2024

Related U.S. Application Data

(63) Continuation of application No. 17/723,269, filed on Apr. 18, 2022, now Pat. No. 11,802,668, which is a continuation of application No. 16/876,690, filed on May 18, 2020, now Pat. No. 11,306,882, which is a continuation of application No. 14/957,423, filed on Dec. 2, 2015, now Pat. No. 10,655,805.

(51) Int. Cl.

| | |
|---|---|
| ***F21V 23/00*** | (2015.01) |
| ***F21S 4/24*** | (2016.01) |
| ***F21V 7/00*** | (2006.01) |
| ***F21V 21/08*** | (2006.01) |
| ***F21V 21/096*** | (2006.01) |
| ***F21V 21/14*** | (2006.01) |
| ***F21V 23/04*** | (2006.01) |
| ***F21V 29/70*** | (2015.01) |
| ***F21V 29/89*** | (2015.01) |
| ***F21Y 101/00*** | (2016.01) |
| ***F21Y 103/10*** | (2016.01) |

(52) U.S. Cl.

CPC .............. *F21S 4/24* (2016.01); *F21V 7/0091* (2013.01); *F21V 21/0832* (2013.01); *F21V 21/096* (2013.01); *F21V 21/14* (2013.01); *F21V 23/005* (2013.01); *F21V 23/04* (2013.01); *F21V 29/70* (2015.01); *F21V 29/89* (2015.01); *F21Y 2101/00* (2013.01); *F21Y 2103/10* (2016.08)

(58) Field of Classification Search

CPC ....... F21S 4/24; F21V 29/503; H01L 25/0753

See application file for complete search history.

(56) References Cited

U.S. PATENT DOCUMENTS 7,145,179 B2 12/2006 Petroski
7,165,863 B1 1/2007 Thomas et al.
7,273,300 B2 9/2007 Mrakovich (Continued)

FOREIGN PATENT DOCUMENTS

EP 2902697 A1 8/2015

*Primary Examiner* — Eric T Eide

(74) *Attorney, Agent, or Firm* — Travis Banta; Loyal IP Law, PLLC

(57) ABSTRACT

Disclosed herein is a multi-element flexible strap light which includes a plurality of light elements disposed on a flexible chassis. The flexible chassis may include a first flexible layer, a printed circuit board, and a second flexible layer. The flexible chassis may be further contained within a third flexible layer, such as a layer of polycarbonate plastic. Further disclosed is a multi-element flexible strap light system which includes a plurality of light elements disposed on a flexible chassis and a remote battery.

18 Claims, 10 Drawing Sheets

(56) References Cited

U.S. PATENT DOCUMENTS

| | | | |
|---|---|---|---|
| 7,922,349 B2 | | 3/2011 | Hunnewell |
| 7,988,332 B2 | | 8/2011 | Lo |
| 8,066,405 B2 | | 11/2011 | Simon |
| 8,348,492 B2 | | 1/2013 | Mier-Langner |
| 9,343,634 B2 | | 5/2016 | Park |
| 10,094,539 B2 | * | 10/2018 | Serwacki ................ F21V 29/74 |
| 10,655,805 B2 | | 5/2020 | Urry |
| 2003/0193803 A1 | | 10/2003 | Lin |
| 2004/0223328 A1 | | 11/2004 | Lee et al. |
| 2010/0271804 A1 | | 10/2010 | Levine |
| 2011/0175533 A1 | | 7/2011 | Holman et al. |
| 2011/0182057 A1 | | 7/2011 | Watson |
| 2014/0268785 A1 | | 9/2014 | Quaal |
| 2014/0307443 A1 | | 10/2014 | Clifford et al. |
| 2015/0124437 A1 | | 5/2015 | Van De Ven et al. |
| 2015/0276146 A1 | | 10/2015 | Wu et al. |
| 2017/0219187 A1 | | 8/2017 | Garcia Lema |

* cited by examiner

MULTI-ELEMENT FLEXIBLE STRAP LIGHT

CROSS-REFERENCE TO RELATED APPLICATIONS

This application is a continuation of co-pending U.S. patent application Ser. No. 17/723,269 filed on Apr. 18, 2022 which is a continuation of U.S. patent application Ser. No. 16/876,690 filed on May 18, 2020, (now U.S. Pat. No. 11,306,882, issued on Apr. 19, 2022) which claims priority to U.S. patent application Ser. No. 14/957,423, filed Dec. 2, 2015 (now U.S. Pat. No. 10,655,805, issued May 19, 2020) entitled "MULTI-ELEMENT FLEXIBLE STRAP LIGHT," which are hereby incorporated by reference herein in its entirety, including but not limited to those portions that specifically appear hereinafter, the incorporation by reference being made with the following exception: In the event that any portion of the above-referenced application is inconsistent with this application, this application supercedes said portion of said above-referenced application.

BACKGROUND

1. Technical Field

This disclosure relates generally to a multi-element flexible strap light. More specifically, the multi-element flexible strap light provides light using a plurality of light elements disposed on a flexible chassis. The plurality of light elements are controlled by a control element. The control element includes a mode switch for operating the plurality of light elements. The multi-element flexible strap light includes a power port for receiving power from a remote battery.

2. Description of the Related Art

Human eyes are particularly sensitive to light. Accordingly, mankind has developed different ways of providing artificial light in darkness. Originally, artificial light was provided by flame based devices, including pitch torches, fuel based lanterns, candles, and other examples. Since the advent of electricity, artificial light has been provided by flashlights and electric battery powered lanterns.

More recently, artificial light has been provided by flashlights that use LED (light emitting diode) technology. LED technology provides reasonably bright light while using relatively low electrical current. More simply, the use of LED technology provides more light for less electrical power than conventional incandescent (bulb and filament) light technology. LED technology also has the advantage of providing more artificial light than conventional incandescent light technology in a smaller physical footprint. More simply, the use of LED technology provides for more light in less physical space than conventional incandescent (bulb and filament) light technology. Because a relatively large amount of artificial light can be generated by a small flashlight, many flashlight form factors have been developed to provide light during a variety of activities or situations.

For example, headlamps have been developed which essentially attach a flashlight to a user's head via an elastic strap. Many users find headlamps helpful because when a headlamp is placed on a user's forehead, a headlamp always points in the direction of a user's eyes. Thus, anything the user looks at is illuminated by the headlamp. While headlamps can be useful, headlamps fail when used in proximity to other people. For example, if a headlamp user looks at another person, the light from the headlamp shines into the other person's eyes, causing the person pain or desensitizing the person's eyes to low amounts of light.

Another example of a popular flashlight form factor which uses LED technology may include a reflector light. Reflector lights typically have several LEDs (light emitting diodes) designed to make a user more visible to other people. Typically reflector lights that are designed to face forward are implemented to emit white light while reflector lights that are designed to face rearward are implemented to emit red light. Reflector lights are typically used by bikers, joggers, or other users exercising along busy roadways in an effort to make themselves more visible to drivers. Conventional reflector lights may include clips that may attach to a user's clothing, shoes, equipment, or hat. Unfortunately, these clips are generally hard to use and, in many cases, do not remain in a fixed position while the bikers, joggers, or other users are participating in their chosen activity. For example, reflector lights tend to move or fall off as a user runs. This movement in the reflector lights can obscure the light and make the bikers, joggers, or other users less visible than they may believe themselves to be, potentially leaving these bikers, joggers, or other users in more danger than they expect.

Electrical flashlights and lanterns also conventionally rely on local battery power. For example, the flashlight or the lantern itself contains or houses a battery that powers the LEDs associated with the flashlight or the lantern. While, in some cases, it may be convenient to house a battery inside the flashlight or the lantern, many flashlights or lanterns either require additional physical space to house the batteries or use small batteries that have limited current capacity (which in turn limits available brightness of emitted light).

Finally, conventional electrical flashlights and lanterns generally have restrictive beam patterns. For example, an electrical flashlight may emit a beam of light in a particular direction with a beam width of 10 degrees. Thus, in the example of an electrical flashlight, a user may have to scan an object from side to side and top to bottom to see the object with sufficient clarity. The electrical flashlight typically illuminates objects that are farther away than does a lantern but provides light in substantially less physical area around the user. A lantern, however, may emit light with a beam width of 360 degrees. Thus, in the example of an electrical lantern, a user may have to closely approach an object to see the object with sufficient clarity. The electrical lantern typically illuminates objects that are relatively close to a user and provides light in substantially more physical area around the user but fails to adequately illuminate objects that are farther away from a user.

Thus, while electrical flashlights and lanterns provide some utility in various situations, neither electrical flashlights nor lanterns are useful in some situations. For example, electrical flashlights cannot illuminate an entire campsite while an electrical lantern cannot illuminate a significant length of a trail. Thus, in many cases, it has been advisable to use both an electrical flashlight and a lantern to illuminate a dark area.

It is therefore one object of this disclosure to provide a multi-element flexible strap light. It is a further object of this disclosure to provide multi-element flexible strap light with a relatively small physical footprint. It is a further object of this disclosure to provide a multi-element flexible strap light that emits light in a direction that is low enough to not adversely affect other people.

It is a further object of this disclosure to provide a multi-element flexible strap light that firmly attaches to a user's clothing, equipment, shoes, or hat without movement during the user's activities. It is a further object of this disclosure to provide a multi-element flexible strap light with a remote battery, reducing the overall physical size of the multi-element flexible strap light. It is a further object of this disclosure to provide a multi-element flexible strap light that emits light in a particular direction while also emitting light in a wider area around a user than conventional technologies.

SUMMARY

In one embodiment, a multi-element flexible strap light is disclosed which includes a plurality of light elements disposed on a flexible chassis. The chassis may include a first flexible layer, a printed circuit board, and a second flexible layer. The flexible chassis may be further contained within a third flexible layer, such as a layer of polycarbonate plastic.

Further disclosed is a multi-element flexible strap light system which includes a plurality of light elements disposed on a flexible chassis and a remote battery. The flexible chassis may include a first flexible layer, a printed circuit board, and a second flexible layer. The flexible chassis may be further contained within a third flexible layer, such as a layer of polycarbonate plastic.

BRIEF DESCRIPTION OF THE DRAWINGS

The accompanying drawings illustrate several embodiments of the multi-element flexible strap light. The illustrated embodiments are exemplary and do not limit the scope of the disclosure.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
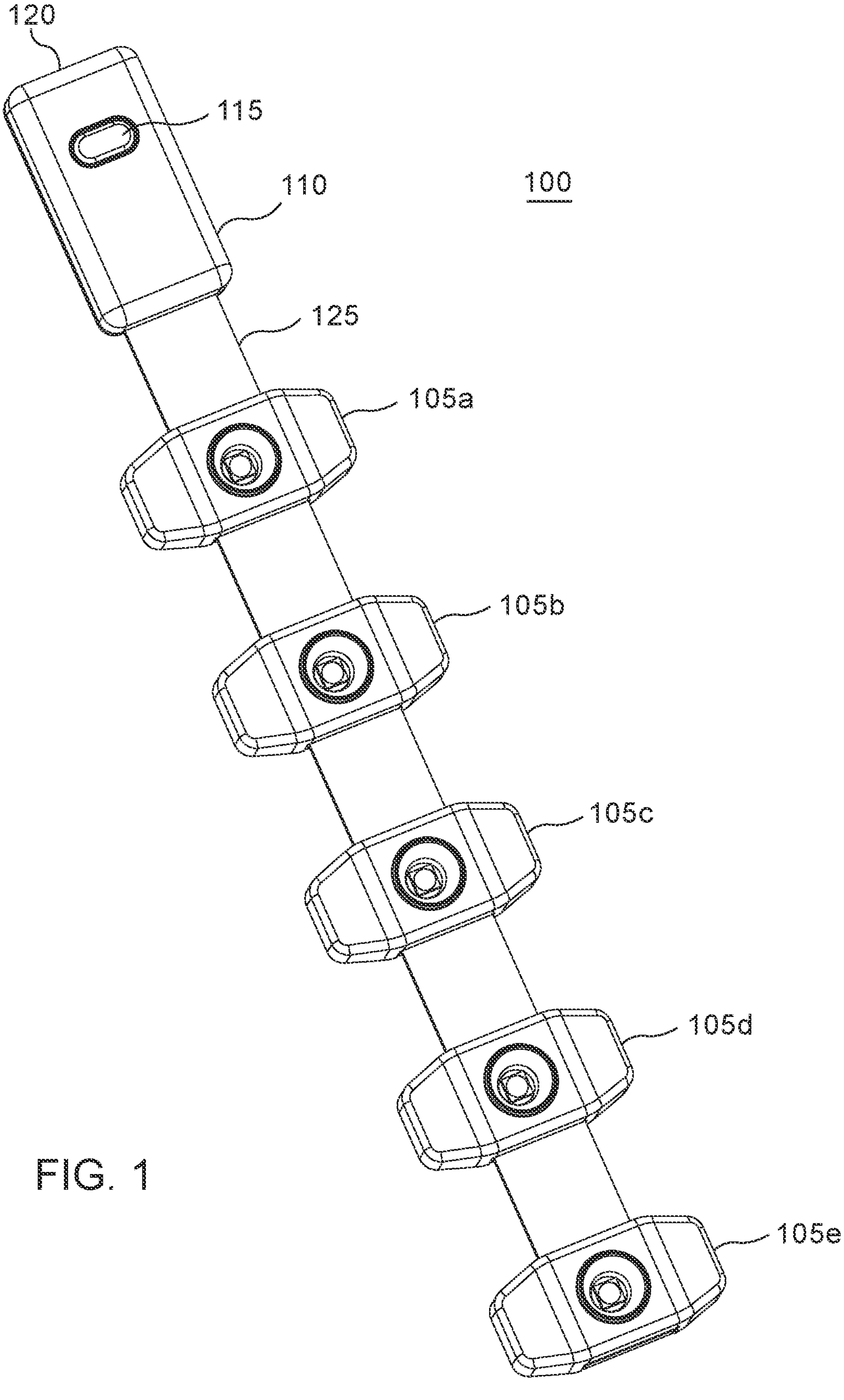
FIG. 1 illustrates a front perspective view of one embodiment of a multi-element flexible strap light.

FIG. 1 illustrates a front perspective view of one embodiment of a multi-element flexible strap light 100. Multi-element flexible strap light 100 includes five individual light elements, light element 105*a*, light element 105*b*, light element 105*c*, light element 105*d*, and light element 105*e*. While five individual light elements are shown, any number of light elements may be implemented on multi-element flexible strap light 100. Light elements 105*a*-105*e* are controlled by a control element 110, which includes a mode switch 115 and a power port 120.

Control element 110 may include a combination of one or more application programs and one or more hardware components. For example, application programs may include software modules, sequences of instructions, routines, data structures, display interfaces, and other types of structures that execute operation. Further, hardware components may include a combination of CPUs (central processing units), buses, volatile and non-volatile memory devices, non-transitory computer readable memory device and media, data processors, control devices, transmitters, receivers, antennas, transceivers, input devices, output devices, network interface devices, and other types of components that are apparent to those skilled in the art.

Control element 110 interfaces with a user to exert control over light elements 105*a*-105*e*. In one embodiment, control element 110 may provide multiple modes for light elements 105*a*-105*e*. For example, control element 110 may include a mode that allows a user to vary a brightness setting of light elements 105*a*-105*e*. In another embodiment, control element 110 may include a mode that allows a user to select a strobe mode for light elements 105*a*-105*e*. In addition, control element 110 may include a mode that allows a user to both select a strobe mode and a brightness mode for light elements 105*a*-105*e*. Further, control element 110 may include a mode that allows a user to both select a strobe mode and a frequency mode for light elements 105*a*-105*e* to control the speed at which light elements 105*a*-105*e* flash in the strobe mode. Control element 110 may further be configured to allow a user to select any or all of a strobe mode, a brightness of light elements 105*a*-105*e* in strobe mode, and a frequency of the strobe.

Control element 110 may further be configured to perform a power calibration test based on power levels detected by control element 110 from a remote battery via power port 120. In one embodiment, control element 110 may determine a power (voltage/current) level that is available and adjust the brightness of multi-element flexible strap light 100 accordingly. Thus, the brightness of multi-element flexible strap light 100 may be monitored and adjusted by control element 110 to provide the brightest available setting for light elements 105*a*-105*e* based on a level of power available from the remote battery.

Mode switch 115 may be implemented as a single switch or a single button disposed within control element 110. The duration of a button press, for example, may select one of the aforementioned modes of operation in control element 110. In other words, an exemplary implementation may select a brightness control mode by pressing mode switch 115 for 3 seconds. In response, control element 110 may begin varying the brightness of light elements 105*a*-105*e* from the dimmest setting to the brightest setting. A particular brightness setting may be selected, for example, when the user releases mode switch 115 at a particular brightness setting.

Power port 120 may be implemented using any connector known in the art and may include data communication connections. In one embodiment, power port 120 may be implemented as a micro-USB connector including one of a micro-A and micro-B USB connector. However, power port 120 may be implemented using mini-USB connectors (both mini-A, and mini-B), USB-A connectors, USB-B connectors, USB-C connectors, barrel connectors, and any other connector known in the art. Power port 120 may receive power, through a wired connection, from a remote battery. In one embodiment, a battery may be disposed in a backpack or a pocket and may be connected to control element 110 via power port 120. Control element 110 may operate using power derived via power port 120 from a remote battery. As used herein, the term "remote battery" means a battery that is not integral to multi-element flexible strap light 100. Rather, a remote battery is connected to multi-element flexible strap light 100 via a wired connection between the remote battery and power port 120. By connecting multi-element flexible strap light 100 to a remote battery, more brighter light can be provided for a longer period of time than conventional electric flashlights and lanterns that contain local battery power. In one example, a user may carry the remote battery in a pocket, in a carrying case, or the user may strap the battery to, for example, the user's arm. Myriads of other ways of carrying a remote battery that may connect to power port 120 may be apparent.

Control element 110 is directly electrically connected to light elements 105*a*-105*e* via a PCB (printed circuit board) contained within a flexible chassis 125. In other words, control element 110 may be mounted on or around at least a portion of flexible chassis 125. Flexible chassis 125 will be discussed in more detail below. However, flexible chassis 125 allows multi-element flexible strap light 100 to conform to various curves and emit light in a plurality of directions. As will be discussed below, flexible chassis 125 may conform to the curvature of a backpack strap as it is worn, for example.

Figure 2:
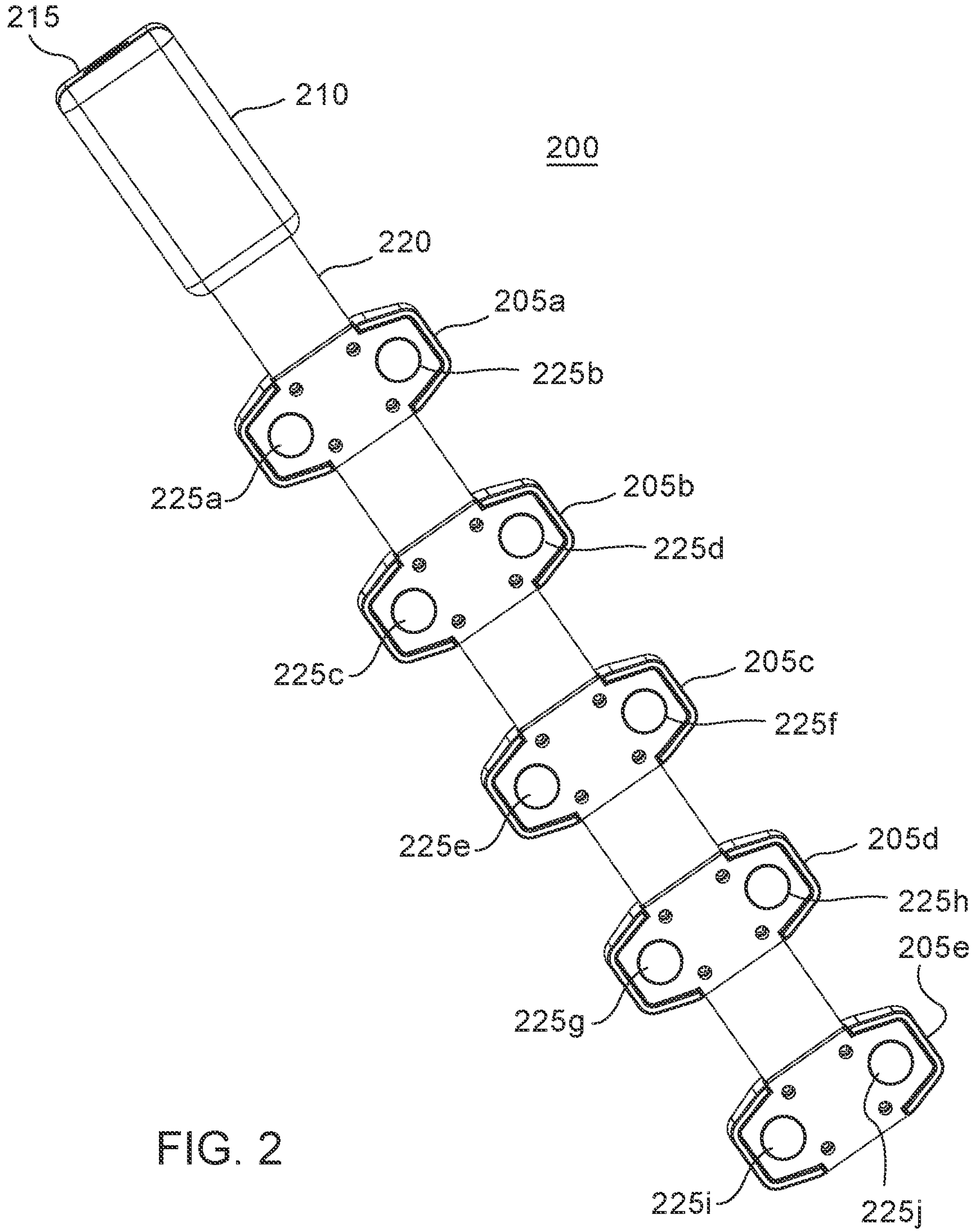
FIG. 2 illustrates a rear perspective view of one embodiment of a multi-element flexible strap light.

FIG. 2 illustrates a rear perspective view of one embodiment of a multi-element flexible strap light 200. Multi-element flexible strap light 200 is similar to multi-element flexible strap light 100 shown in FIG. 1 and includes five individual light elements, light element 205*a*, light element 205*b*, light element 205*c*, light element 205*d*, and light element 205*e*. As previously discussed, any number of light elements may be implemented on multi-element flexible strap light 200. Also, as before, light elements 205*a*-205*e* are controlled by a control element 210 which includes a mode switch (similar in implementation and description to mode switch 115 and shown in FIG. 1) and a power port 120. Control element 210 is connected to light elements 205*a*-205*e* by flexible chassis 220, similar in implementation and description to flexible chassis 125, shown in FIG. 1.

In one embodiment, light element 205*a*, for example, may include two magnets such as rare earth magnet 225*a* and rare earth magnet 225*b*. Similarly, light element 205*b* may include rare earth magnet 225*c* and rare earth magnet 225*d*. Light element 205*c* may include rare earth magnet 225*e* and rare earth magnet 225*f*. Light element 205*d* may include rare earth magnet 225*g* and rare earth magnet 225*h*. Light element 205*e* may include rare earth magnet 225*i* and rare earth magnet 225*j*. Each of rare earth magnets 225*a*-225*j* are disposed on an anterior side of a corresponding light element 205*a*-205*e* and disposed on opposite sides of light elements 205*a*-205*e* along an axis of light elements 205*a*-205*e* that is perpendicular to flexible chassis 220.

Rare earth magnets 225*a*-225*j* may be used to connect multi-element flexible strap light 200 to any metal object. For example, multi-element flexible strap light 200 may connect via rare earth magnets 225*a*-225*j* to the hood of a car, to a work bench, or another work light implementation. Multi-element flexible strap light 200 may further function as an under counter cabinet light, a bar light, a night light, or any other situation where multi-element flexible strap light 200 may connect to a metal via rare earth magnets 225*a*-225*j*. The polarities of rare earth magnets 225*a*-225*j* are configured such that two of multi-element flexible strap light 200 may be magnetically connected to each other back to back.

Figure 3:
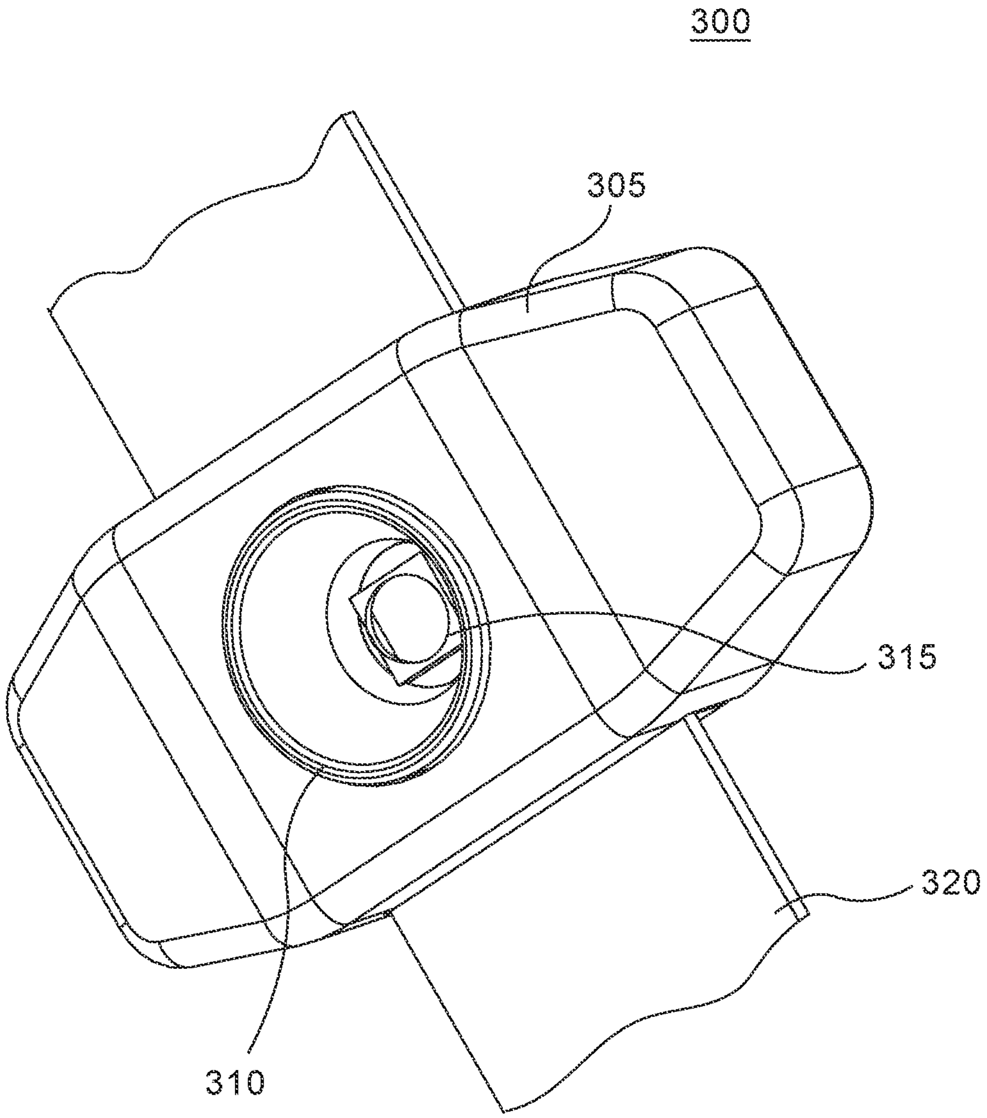
FIG. 3 illustrates a front perspective view of one light element of a multi-element flexible strap light.

FIG. 3 illustrates a front perspective view one light element 305 of a multi-element flexible strap light 300. Light element 305 may be constructed using a metal material, such as aluminum, which may be cast or machined and act as a heat sink. Other metals may be suitable for light element 305 including titanium, and other lightweight metals. Light element 305 may be cast or machined according to any suitable implementation.

Light element 305 may include a lens 310. In one embodiment, lens 310 may be a TIR (Total Internal Reflection) lens or may be constructed using a polycarbonate plastic, glass, or any other material suitable to focus light. In one embodiment, lens 310 may be colored or include a light filter to change the color of the light emitted by multi-element flexible strap light 300. For example, lens 310 may be tinted red or include a red filter to cause red light to be emitted from multi-element flexible strap light 300.

Light element 305 further includes an LED 315. LED 315 may be a super bright LED capable of emitting up to approximately 800 lumens of light at maximum conditions. Accordingly, LED 315 may be thermally connected to light element 305 to draw heat away from LED 315 and dissipate that heat into the ambient air through the metal which makes up light element 305. In one embodiment, one or more surfaces of light element 305 may include one or more heat sink fins which increase surface area of light element 305 and thereby expose more heat to more air, which serves to more quickly dissipate heat. LED 315 may be connected to flexible chassis 320 which provides power to LED 315.

Figure 4:
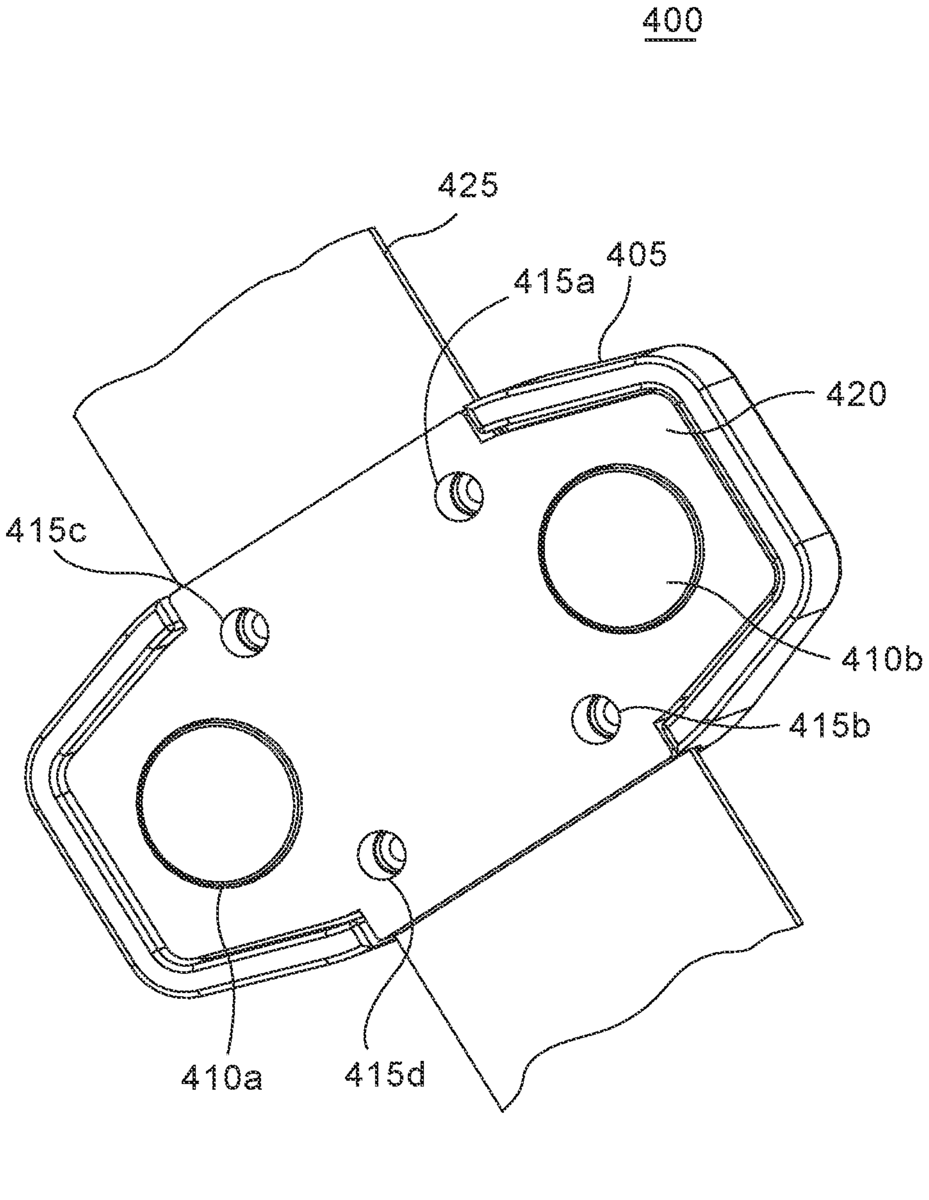
FIG. 4 illustrates a rear perspective view of one light element of a multi-element flexible strap light.

FIG. 4 illustrates a rear perspective view of one light element 405 of a multi-element flexible strap light 400. Light element 405 is similar in implementation and description to light element 305 discussed above and shown in FIG. 3. Light element 405 includes rare earth magnet 410*a* and rare earth magnet 410*b*. Rare earth magnet 410*a* and rare earth magnet 410*b* are similar in implementation and description to rare earth magnets 225*a*-225*j* discussed above and shown in FIG. 2.

In one embodiment, an anterior portion of light element 405 may be connected to a posterior portion of light element 405 by screw 415*a*, screw 415*b*, screw 415*c*, and screw 415*d*. Screws 415*a*-415*d* may thread into the anterior portion of light element 405 through the posterior portion of light element 405, thereby securely holding the anterior portion of light element 405 to the posterior portion of light element 405 around an LED, such as LED 315 shown in FIG. 3 mounted on flexible chassis 425. In one embodiment, light element 405, and the rest of a multi-element flexible strap light 400, may be IP-67 waterproof.

Figure 5:
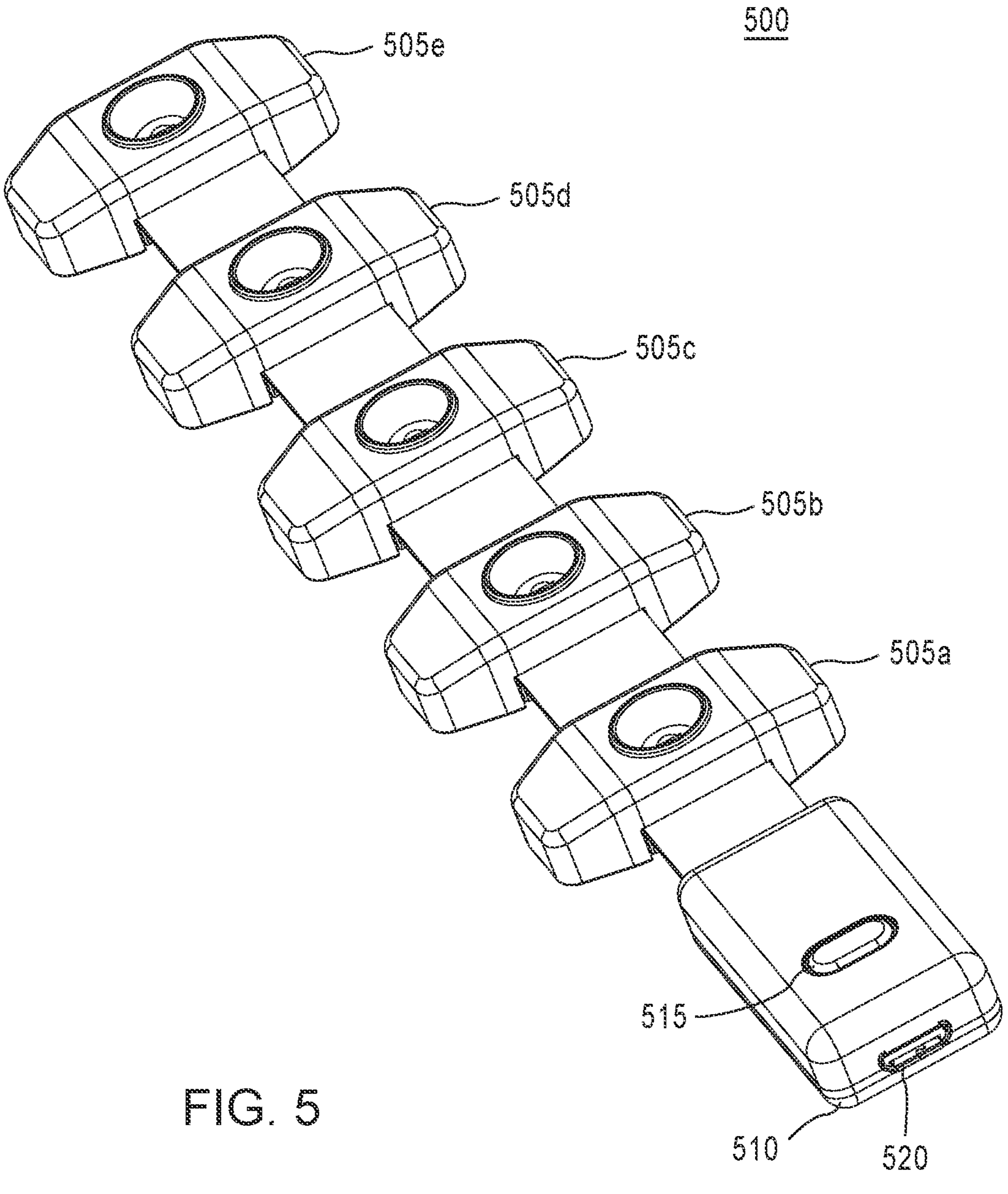
FIG. 5 illustrates a top down perspective view of one embodiment of a multi-element flexible strap light.

FIG. 5 illustrates a top down perspective view of one embodiment of a multi-element flexible strap light 500. Multi-element flexible strap light 500 includes light element 505*a*, light element 505*b*, light element 505*c*, light element 505*d*, and light element 505*e*, which are similar in implementation and description to light elements 105*a*-105*e* discussed above and shown in FIG. 1. Multi-element flexible strap light 500 further shows control element 510 and mode switch 515 which are similar in implementation and description to control element 110 and mode switch 115 discussed above and shown in FIG. 1.

Multi-element flexible strap light 500 further illustrates power port 520. Power port 520 may be implemented as a micro-USB connector including one of a micro-A and micro-B connector. However, power port 520 may be implemented using mini-USB connectors (both mini-A, and mini-B), USB-A connectors, USB-B connectors, USB-C connectors, barrel connectors, and any other connector known in the art. Power port 520 may connect to a remote battery to provide power to multi-element flexible strap light 500.

Figure 6:
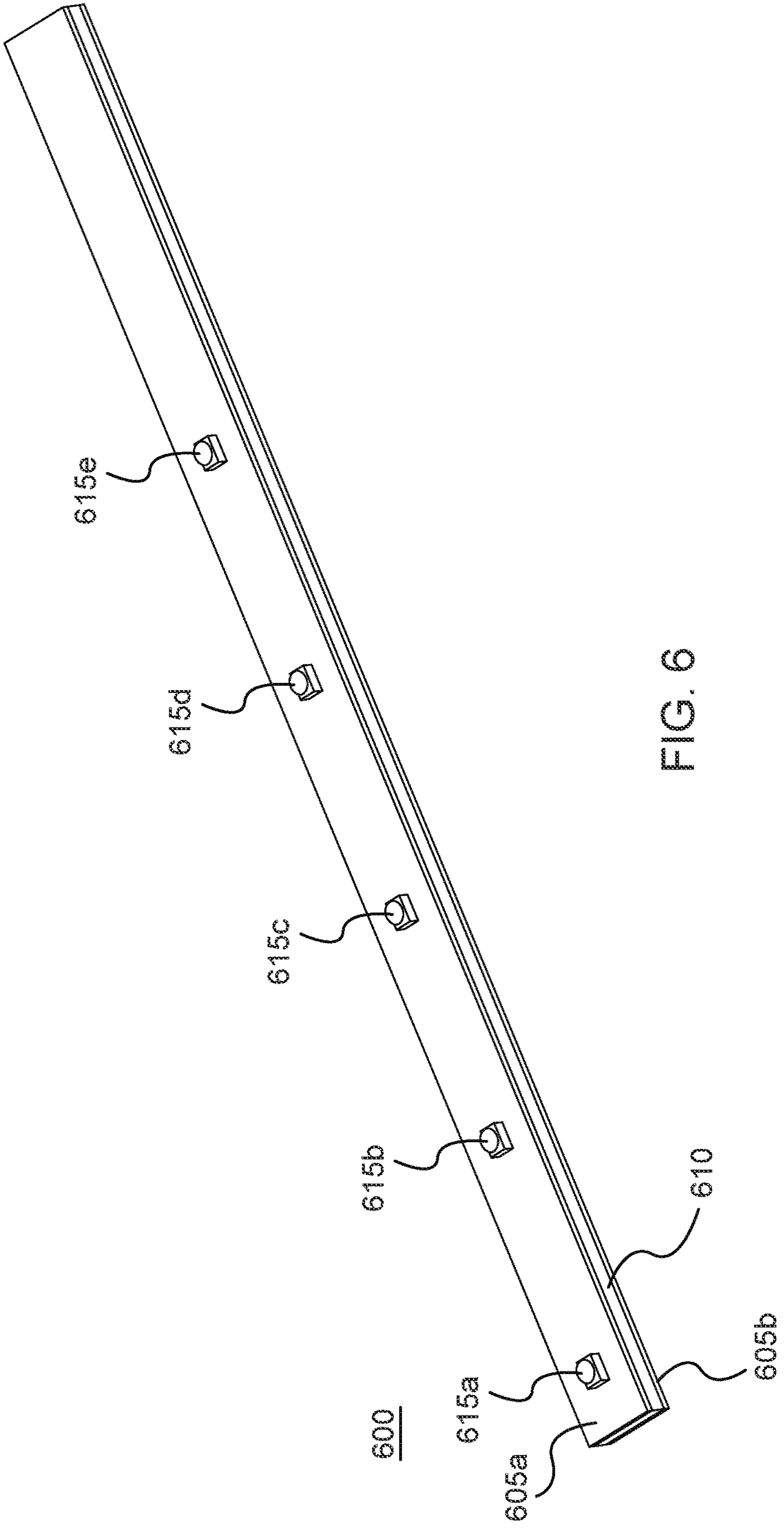
FIG. 6 illustrates a side perspective view of a flexible chassis used in conjunction with a multi-element flexible strap light.

FIG. 6 illustrates a side perspective view of a flexible chassis 600 used in conjunction with a multi-element flexible strap light, such as multi-element flexible strap light 100, shown in FIG. 1. Flexible chassis 600 is constructed using a first flexible layer 605*a*, a PCB 610, and, additionally or alternatively, a second flexible layer 605*b*. Flexible chassis 600 may be implemented with one or more flexible layers (i.e., either first flexible layer 605*a* or second flexible layer 605*b* or both) according to any desired implementation. First flexible layer 605*a* and second flexible layer 605*b* may be made of stainless spring steel, metals, graphite, fiberglass, silicates, epoxies, resins, carbon nanotube meshes, carbon fibers, plastics, polycarbonate, composites of the foregoing materials, and any other material that provides flexibility, strength, protection from water intrusion, and physical protection to an underlying circuit board. While, distinct layers are shown in FIG. 6, it is possible that first flexible layer 605*a* and second flexible layer 605*b* may be disposed as layers within PCB 610 (which is itself formed from several layers—e.g., an insulating layer, a conducting layer, a surface mount layer, and etc.). In one embodiment, PCB 610 may be implemented with flexible materials which allow for solder joints to flex without cracking or breaking. In one embodiment, PCB 610 is attached to second flexible layer 605*b* using an adhesive or lamination process. First flexible layer 605*a* may also be attached to PCB 610 using an adhesive or lamination process. First flexible layer 605*a* may include one or more recesses to allow LED 615*a*, LED 615*b*, LED 615*c*, LED 615*d*, and LED 615*e*, which are electrically connected to PCB 610, to protrude through first flexible layer 605*a*. Finally, flexible chassis 600 may be contained within a third layer of flexible material, not shown, such as a layer of polycarbonate plastic, which provides additional protection to flexible chassis 600.

First and second flexible layers 605*a* and 605*b* are disposed on opposite sides of PCB 610 to allow flexible chassis 600 to flex. In other words, flexible chassis 600 may flex to follow a curve, such as the curve of a backpack strap over a user's shoulder. In an extreme example, flexible chassis 600 may flex in an arc to about 180 degrees. As flexible chassis 600 flexes, the angle and direction of light emitted by LEDs 615*a*-615*e* changes. For example, as the degree of bend between any two of LEDs 615*a*-615*e* increases, the angle of the light emitted by LEDs 615*a*-615*e* widens, broadening the area into which light is emitted. Thus, a user who desires more direct light at a longer distance may dispose multi-element flexible strap light 100 on a non-curved or substantially non-curved surface. A user who desires to cast light into a broader area at a shorter distance may dispose multi-element flexible strap light 100 on a curved or substantially curved surface.

Figure 7A:
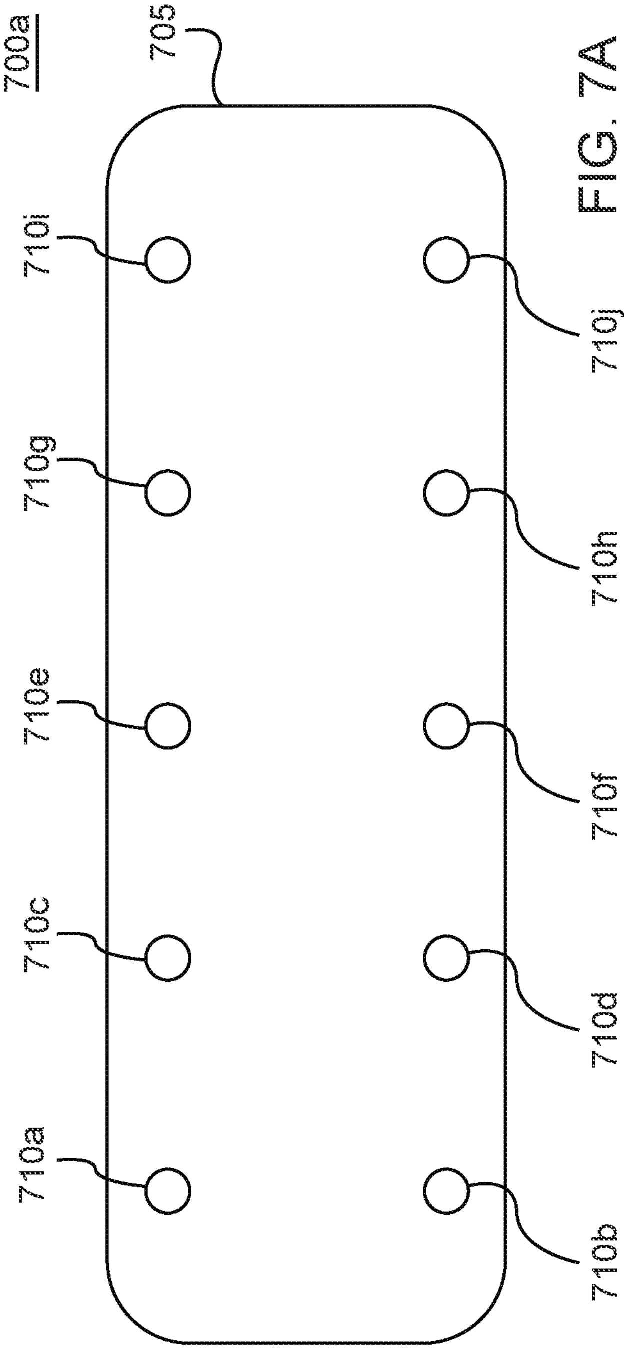
FIG. 7*a* illustrates a top view of a magnetic backer for a multi-element flexible strap light.

FIG. 7*a* illustrates a top view of a magnetic backer 700*a* for a multi-element flexible strap light, such as multi-element flexible strap light 100 discussed above and shown in FIG. 1. Magnetic backer 700*a* may include a layer of polycarbonate plastic 705 which houses a number of magnets, such as rare earth magnet 710*a*, rare earth magnet 710*b*, rare earth magnet 710*c*, rare earth magnet 710*d*, rare earth magnet 710*e*, rare earth magnet 710*f*, rare earth magnet 710*g*, rare earth magnet 710*h*, rare earth magnet 710*i*, and rare earth magnet 710*j*. Rare earth magnets 710*a*-710*j* are disposed in the polycarbonate plastic layer 705 in a manner that corresponds to the locations of rare earth magnets 225*a*-225*j* discussed above and shown in FIG. 2. The polarities of rare earth magnets 710*a*-710*j* are matched to the polarities of rare earth magnets 225*a*-225*j* such that magnetic backer 700*a* may magnetically attach to multi-element flexible strap light 100, for example.

In one embodiment, a user may attach multi-element flexible strap light 100 to an article of clothing using magnetic backer 700*a*. For example, a user may dispose the multi-element flexible strap light 100 on the outside of a jacket and hold the multi-element flexible strap light 100 in place on the jacket by disposing magnetic backer 700*a* on the inside of the jacket in a position corresponding to the position of multi-element flexible strap light 100 on the outside of the jacket. Accordingly, multi-element flexible strap light 100 may be held in place on any article of clothing by magnetic backer 700*a*.

Figure 7B:
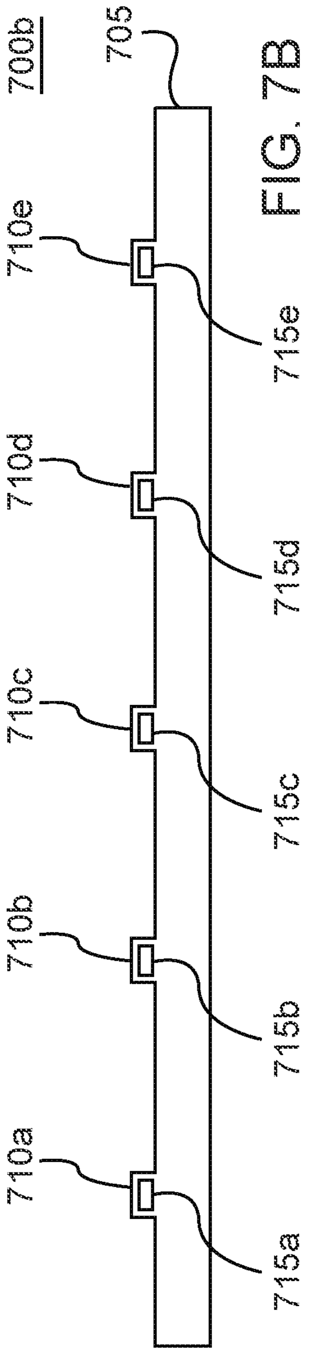
FIG. 7*b* illustrates a side view of a magnetic backer for a multi-element flexible strap light.

FIG. 7*b* illustrates a side view of a magnetic backer 700*b* for a multi-element flexible strap light, such as multi-element flexible strap light 100, shown in FIG. 1. Magnetic backer 700*b* is similar in implementation and description to magnetic backer 700*a*, discussed above and shown in FIG. 7*a*. In FIG. 7*b*, a polycarbonate layer 705 contains magnet blister 710*a*, magnet blister 710*b*, magnet blister 710*c*, magnet blister 710*d*, and magnet blister 710*e*. Each of magnet blisters 710*a*-710*e* contain a magnet, such as rare earth magnet 715*a*, rare earth magnet 715*b*, rare earth magnet 715*c*, rare earth magnet 715*d*, and rare earth magnet 715*e*. It should be noted that from the side view of FIG. 7*b*, only half of the magnet blisters and rare earth magnets can be seen in FIG. 7*b*.

Magnetic backer 700*b* and magnetic backer 700*a* may be used in the same fashion. Accordingly, a user may dispose a light source in any location on the user's person. A hiker, for example, may dispose multi-element flexible strap light 100 vertically on a shirt or horizontally along a hat. Other applications for the magnetic attachment of multi-element flexible strap light 100 to magnetic backer 700*a* or magnetic backer 700*b* include people participating in activities such as walking, running, mountain biking, lighting a campsite, lighting a tent, cross country skiing, downhill skiing, snowshoeing, caving, road biking, climbing, rappelling, hunting, fishing, or any other activity which may be performed during a dark portion of a day. Multi-element flexible strap light 100 and magnetic backer 700*a* and magnetic backer 700*b* may further be used on a dog collar or may be installed on children's clothing or equipment while they are walking to school, for example. In any implementation, magnetic backer 700*a* and magnetic backer 700*b* hold multi-element flexible strap light 100 securely in place during the activity.

Figure 8:
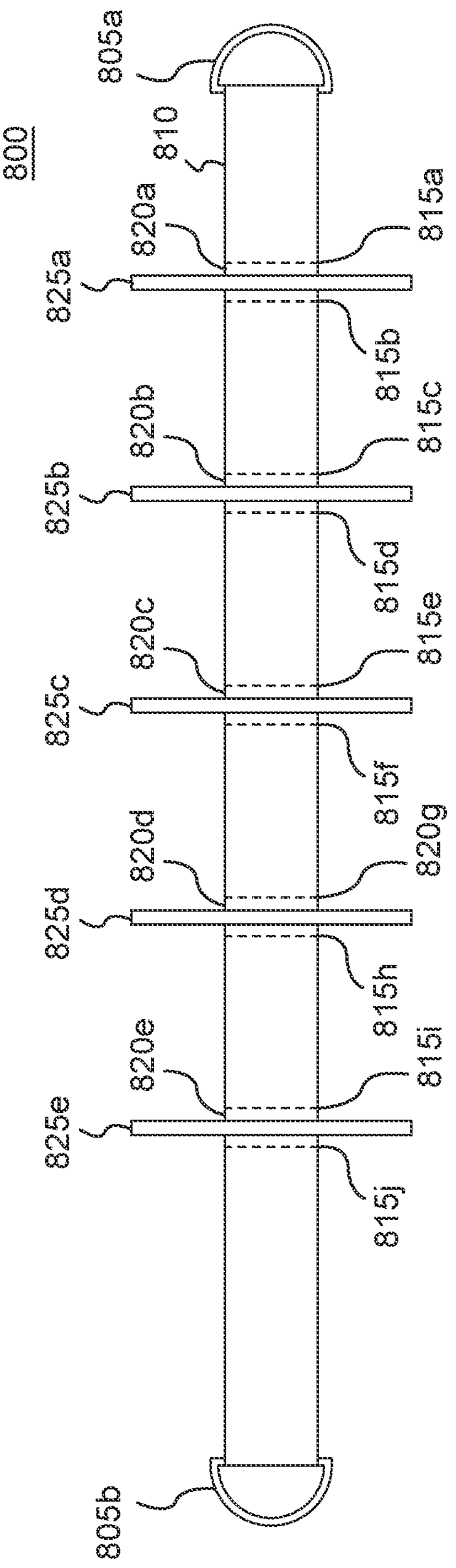
FIG. 8 illustrates a top view of a strap used in conjunction with a multi-element flexible strap light.

FIG. 8 illustrates a top view of a strap 800 used in conjunction with a multi-element flexible strap light, such as multi-element flexible strap light 100 discussed above and shown in FIG. 1. Strap 800 includes a D-ring 805*a* terminating one side of strap 800 and a D-ring 805*b* terminating an opposite side of strap 800. D-ring 805*a* and D-ring 805*b* are connected by a two layer strap of strap material, such as webbing 810. While webbing, a material typically made of synthetic fibers including nylon, polypropylene, polyester, Dyneema, and Kevlar, is described, any material suitable for use in a strap may be used. Webbing 810 may include a number of seams, such as seam 815*a*, seam 815*b*, seam 815*c*, seam 815*d*, seam 815*e*, seam 815*f*, seam 815*g*, seam 815*h*, seam 815*i*, and seam 815*j*. Seams 815*a*-815*j* may be created in webbing 810 by stitching (sewing), heat bonding, adhesive, or any other attachment mechanism known in the art. Seams 815*a*-815*j* create pockets, such as pocket 820*a*, pocket 820*b*, pocket 820*c*, pocket 820*d*, and pocket 820*e*. Pockets 820*a*-820*e* are open on both sides to allow hook and loop tape straps, such as hook and loop tape strap 825*a*, hook and loop tape strap 825*b*, hook and loop tape strap 825*c*, hook and loop tape strap 825*d*, and hook and loop tape strap 825*e*, to be disposed within pockets 820*a*-820*e*. Hook and loop tape straps 825*a*-825*e* may releasably connect to themselves by means of hooks and loops disposed on alternate sides of the hook and loop tape straps.

Figure 9:
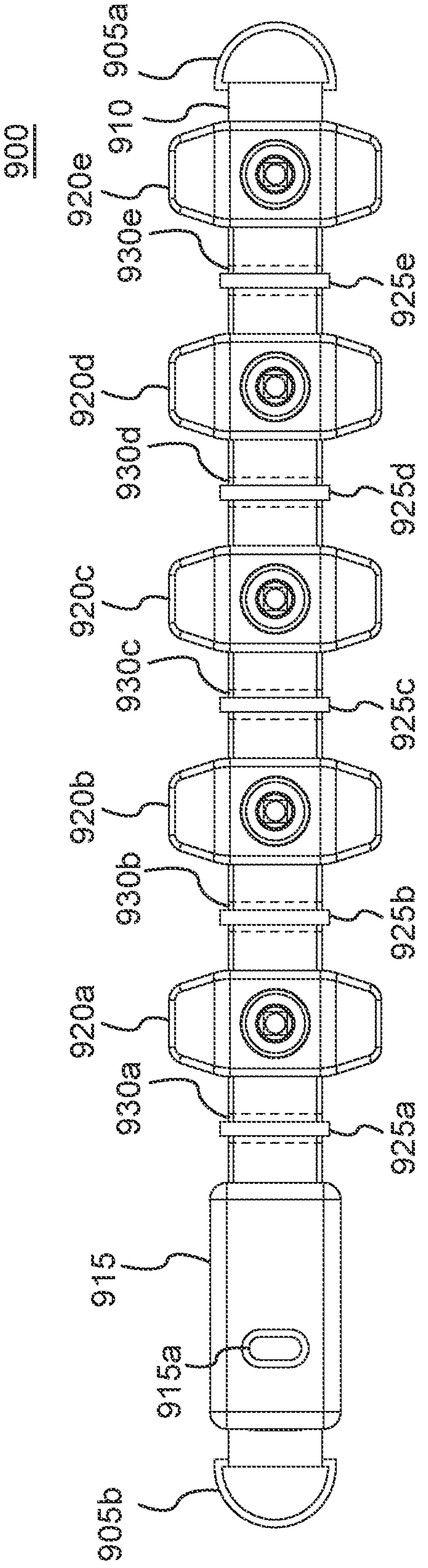
FIG. 9 illustrates a top view of the strap shown in FIG. 8 retaining a multi-element flexible strap light.

FIG. 9 illustrates a top view of strap 800 shown in FIG. 8 retaining a multi-element flexible strap light, such as multi-element flexible strap light 100 discussed above and shown in FIG. 1. Strap 900 shown in FIG. 9 is similar in implementation and description to strap 800 discussed above and shown in FIG. 8. Strap 900 includes D-ring 905*a* and D-ring 905*b* which are similar in implementation and description to D-ring 805*a* and D-ring 805*b* discussed above and shown in FIG. 8. Strap 910 is also similar in implementation and description to strap 810 discussed above and shown in FIG. 8.

Strap 900 attaches to a multi-element flexible strap light, such as multi-element flexible strap light 100 discussed above and shown in FIG. 1. The multi-element flexible strap light includes control element 915 and a mode switch 915*a*, which are similar in implementation and description to control element 110 and mode switch 115 discussed above and shown in FIG. 1. The multi-element flexible strap light further includes light element 920*a*, light element 920*b*, light element 920*c*, light element 920*d*, and light element 920*e*, which are similar in implementation and description to light elements 105*a*-105*e* discussed above and shown in FIG. 1. Strap 900 includes hook and loop tape straps such as hook and loop tape strap 925*a*, hook and loop tape strap 925*b*, hook and loop tape strap 925*c*, and hook and loop tape strap 925*d* which are disposed in pockets such as pocket 930*a*, pocket 930*b*, pocket 930*c*, pocket 930*d*, and pocket 930*e*. Hook and loop tape straps 925*a*-925*e* and pockets 930*a*-930*e* are respectively similar in implementation and description to hook and loop tape straps 825*a*-825*e* and pockets 820*a*-820*e* discussed above and shown in FIG. 8.

In implementation, hook and loop tape straps 925*a*-925*e* may connect to themselves by means of hooks and loops disposed on alternate sides of the hook and loop tape straps around the multi-element flexible strap light. In one embodiment, each of hook and loop tape straps 925*a*-925*e* may connect to themselves between control element 915 and light element 920*a* or between light elements 920*a*-920*e*. In this manner, hook and loop tape straps 925*a*-925*e* secure multi-element flexible strap light 100 to strap 900. Once hook and loop tape straps 925*a*-925*e* secure multi-element flexible strap light 100 to strap 900, D-ring 905*a* and D-ring 905*b* may be used to connect multi-element flexible strap light 100 to, for example, a backpack strap. In another embodiment, hook and loop tape straps 925*a*-925*e* may connect around a backpack strap and a multi-element flexible strap light 100 simultaneously to secure multi-element flexible strap light 100 to a backpack strap.

Strap 900 may be used in any activity discussed herein, such as those discussed above with respect to magnetic backer 700*a* and magnetic backer 700*b* discussed in FIG. 7. While strap 900 is a different implementation from the use of magnetic backer 700*a* and magnetic backer 700*b*, strap 900 provides yet another alternative to reliably secure a multi-element flexible strap light 100 in position during an activity. Accordingly, a multi-element flexible strap light 100 may be more visible on roadways than other conventional electric flashlights and lanterns.

Figure 10:
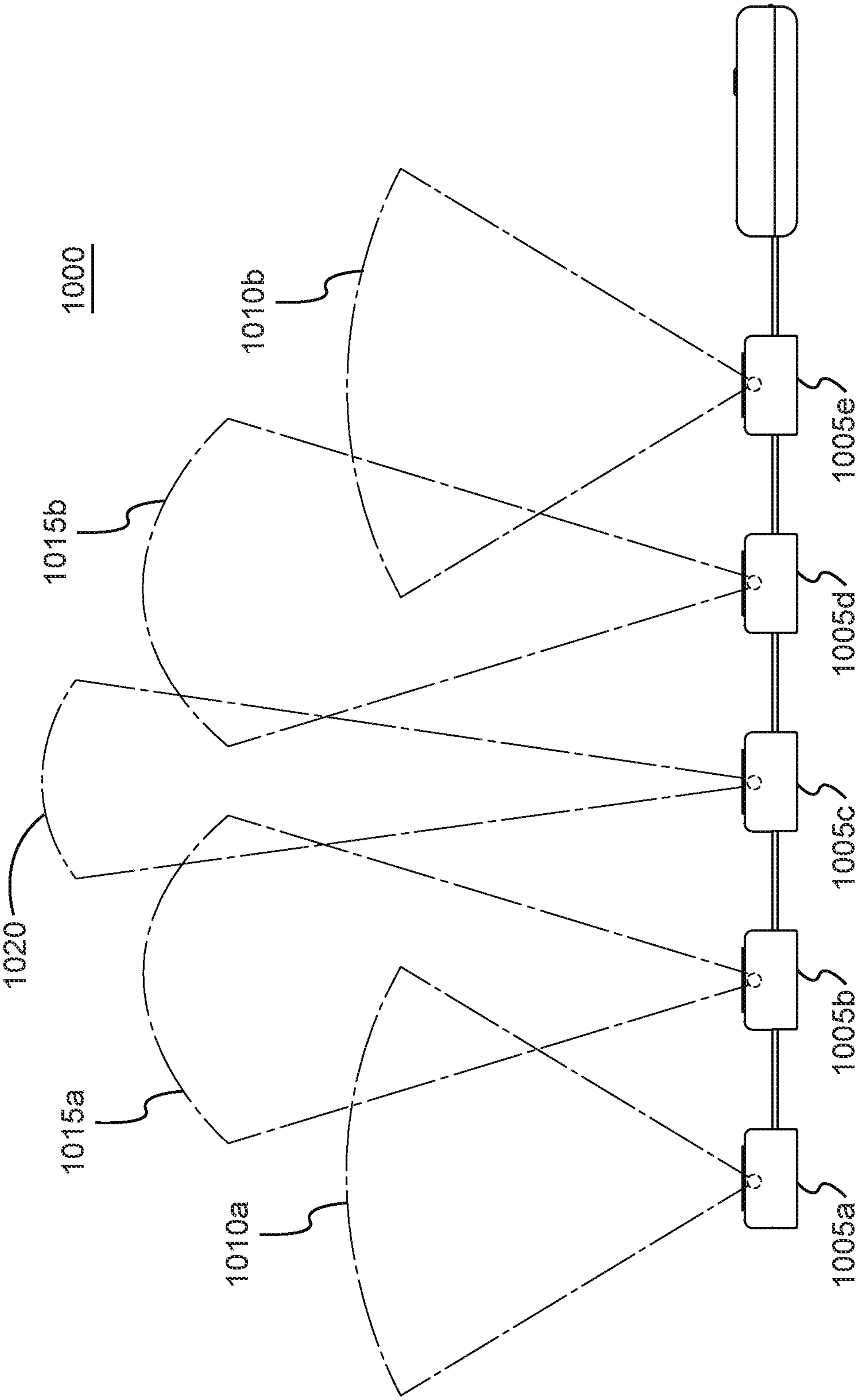
FIG. 10 illustrates an exemplary beam pattern for the multi-element flexible strap light.

FIG. 10 illustrates one exemplary beam pattern 1000 for a multi-element flexible strap light such as multi-element flexible strap light 100 discussed above and shown in FIG. 1. Beam patterns other than beam pattern 1000 may be implemented by multi-element flexible strap light 100. Further, lenses, such as TIR lenses, may be used within multi-element flexible strap 100 that direct light at an angle different than perpendicular to an LED. For example, a TIR lens in one exemplary light element may focus and direct light towards the ground near a user's feet while another TIR lens in another exemplary light element may focus and direct light to the left of the user and while another TIR lens in another exemplary light element may focus and direct light to the right of the user. Many implementations to suit specific applications are possible.

FIG. 10 illustrates five LEDs such as LED 1005*a*, LED 1005*b*, LED 1005*c*, LED 1005*d*, and LED 1005*e* which may be implemented in light elements 105*a*-105*e* discussed above and shown in FIG. 1. In one embodiment, LED 1005*a* and LED 1005*e* may be implemented with lenses that cast light at a wider angle at a shorter distance relative to LEDs 1005*b*-1005*d*. In other words, LED 1005*a* and LED 1005*e* may be implemented with lenses that cast a beam pattern of 35-50 degrees. LED 1005*b* and LED 1005*d* may be implemented with lenses that cast light at a narrower angle than LED 1005*a* and LED 1005*e* but at a greater distance than LED 1005*a* and LED 1005*e*. In other words, LED 1005*b* and LED 1005*d* may be implemented with lenses that cast a beam pattern of 25-35 degrees. LED 1005*c* may be implemented with a lens that casts light at a narrower angle than LED 1005*b* and LED 1005*d* but at a greater distance than LED 1005*b* and LED 1005*d*. In other words, LED 1005*c* may be implemented with lenses that cast a beam pattern of 15-25 degrees.

In this fashion, beam pattern 1000 provides light in a wide area while at the same time providing light over a substantial distance, when compared with conventional electric flashlights. Because multi-element flexible strap light 100, for example, has the ability to flex, the beam width may be adjusted by flexing the multi-element flexible strap light in a certain implementation, as desired by a user and according to the specific activity engaged in by the user.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A strap light, comprising:

a control element disposed on one end of the strap light, the control element including a light control interface element;

a plurality of heat sinks disposed along and connected to a chassis, wherein each one of the plurality of heat sinks includes a light element and a lens disposed within each one of the plurality of heat sinks;

wherein the chassis connects the control element to the plurality of heat sinks wherein two of the lenses in the plurality of heat sinks cause light to be emitted by the two light elements at a matching angle;

wherein each one of the plurality of heat sinks comprises a posterior portion which includes the lens and an anterior portion, wherein the posterior portion and the anterior portion connect to each other; and wherein the posterior portion and the anterior portion connect to the flexible chassis between the posterior portion and the anterior portion of the each one of the plurality of heat sinks.

2. The strap light of claim 1, wherein the matching angle is 35-50 degrees.

3. The strap light of claim 1, wherein the matching angle is 15-25 degrees.

4. The strap light of claim 1, wherein the two of the lenses disposed within the two of the plurality of heat sinks are disposed on opposing sides of the chassis.

5. The strap light of claim 4, wherein the matching angle is between 35-50 degrees.

6. The strap light of claim 1, wherein the two of the lenses disposed within two of the plurality of heat sinks are disposed on either side of a heat sink disposed at a middle point of the chassis.

7. The strap light of claim 6, wherein the matching angle is between 15-25 degrees.

8. The strap light of claim 1, wherein the chassis is flexible such that light emitted by the two light element elements at a matching angle adjusts a beam width of the strap light to emit light in a wider beam width during flexing of the chassis.

9. A system, comprising:

a strap light, comprising:

a control element disposed on one end of the strap light, the control element including a light control interface element;

a plurality of heat sinks disposed along and connected to a flexible chassis, wherein each one of the heat sinks includes a light element and a lens disposed within each one of the plurality of heat sinks, and wherein the flexible chassis connects the control element to the plurality of heat sinks, wherein two of the lenses in the plurality of heat sinks cause light to be emitted by the two light elements at a matching angle;

a remote battery;

wherein each one of the plurality of heat sinks comprises a posterior portion which includes the lens and an anterior portion, wherein the posterior portion and the anterior portion connect to each other; and wherein the posterior portion and the anterior portion connect to the flexible chassis between the posterior portion and the anterior portion of the each one of the plurality of heat sinks.

10. The strap light of claim 9, wherein the matching angle is 35-50 degrees.

11. The strap light of claim 9, wherein the matching angle is 15-25 degrees.

12. The strap light of claim 9, wherein the two of the lenses disposed within the two of the plurality of heat sinks are disposed on opposing sides of the chassis.

13. The strap light of claim 12, wherein the matching angle is between 35-50 degrees.

14. The strap light of claim 9, wherein the two of the lenses disposed within two of the plurality of heat sinks are disposed on either side of a heat sink disposed at a middle point of the chassis.

15. The strap light of claim 14, wherein the matching angle is between 15-25 degrees.

16. The system of claim 13, wherein the two of the lenses are disposed over the light element in two of the plurality of heat sinks and focus light from the light element at the matching angle.

17. The system of claim 9, wherein the light element in each one of the plurality of heat sinks is a light emitting diode.

18. The system of claim 10, wherein a magnetic backer includes a plurality of magnets positioned to connect to magnets disposed in each one of the plurality of heat sinks.

* * * * *